Nov. 11, 1969 R. ACH 3,477,167

FIGURE SHAPED BLOCKS WITH INTEGRAL CONNECTORS

Filed April 21, 1967

INVENTOR.
RENE ACH

Nov. 11, 1969 R. ACH 3,477,167
FIGURE SHAPED BLOCKS WITH INTEGRAL CONNECTORS
Filed April 21, 1967 2 Sheets-Sheet 2

INVENTOR.
RENE ACH

BY Woodard, Weikart, Emhardt & Naughton
Attorneys

United States Patent Office 3,477,167
Patented Nov. 11, 1969

3,477,167
FIGURE SHAPED BLOCKS WITH INTEGRAL CONNECTORS
René Ach, 47 Ave. des Gobelins, Paris, France
Filed Apr. 21, 1967, Ser. No. 632,809
Claims priority, application France, May 25, 1966, 62,933
Int. Cl. A63h *33/08, 3/16*
U.S. Cl. 46—22                     3 Claims

ABSTRACT OF THE DISCLOSURE

A constructional block shaped like a human or other animal figure having a cylindrical trunk, a spherical head above and spaced from the trunk by a short neck, bow legs at the other end of and extending in a semi-circular downwardly facing arc from the trunk and outstretched diverging arms which include arcuate inwardly directed relief portions near their ends, the arcuate portions of the arms and legs being of a radius which is the same as that of the head and of the trunk to facilitate assembly of the blocks.

---

This invention relates to constructional blocks for use as toys, playthings or for training, educational or like purposes.

Building blocks of rectangular and like shape which interlock with one another in various ways by means of cylindrical and like projections which enter tubular holes are well known.

An object of the present invention is to provide a constructional block or set of blocks of rather more interesting formation.

According to the present invention I provide a constructional block shaped like an animal with arms, legs, a body and a head, the proportions and shape of the block being such that the arms and the legs of a first block will embrace and fit the head and body of a second block of similar construction. The animal may be a human figure or may be a domestic, farm or wild animal in which case the animal block instead of having 2 arms and 2 legs will have 4 legs or the animal may be a bird in which case he will have two legs and two wings.

In order that the invention may be more clearly understood and readily carried into effect reference is now directed to the accompanying drawings given by way of example and in which.

Figure 1:
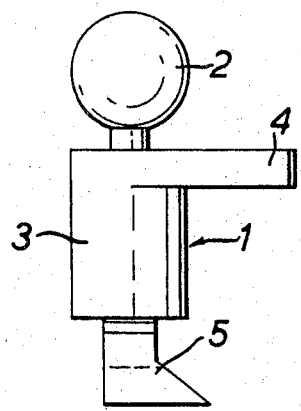
FIG. 1 is a side elevation of a human figure block constructed in accordance with the invention.
Figure 2:
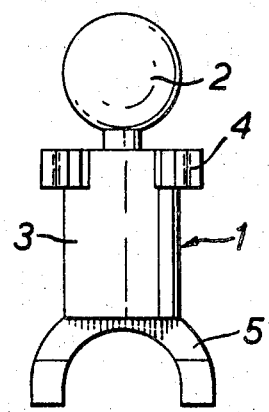
FIG. 2 is a front elevation.
Figure 3:
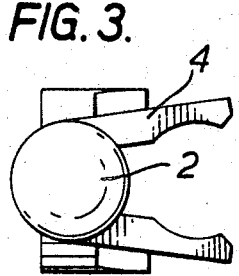
FIG. 3 is a top plan.
Figure 4:
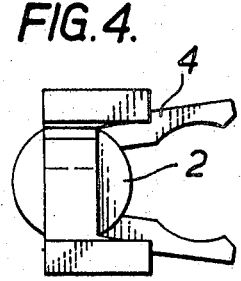
FIG. 4 is an underneath plan.

One embodiment of the invention will now be described by way of example particularly with FIGURES 1 to 4 of the accompanying drawings. In the drawings the block is in the shape of a human figure 1 having a spherical head 2, a cylindrical body 3, one pair of adjacent limbs in the form of arms 4 outstretched and concave towards the inside, and another pair of adjacent limbs in the form of legs 5 also concave towards the inside. The radius of the cylindrical body and spherical head are substantially equal to the radii of the concavity of the arms and legs. The arms 4 and legs 5 are both therefore proportioned and shaped to embrace the head 2 or the body 3 of another similar block 1. Taking two blocks 1, by way of example, assembly may be effected by making the arms 4 of the first block embrace the body 3 or head 2 of the second block or by making the legs 5 of the first block embrace the body 3 or head 2 of the second block, one block being thus supported in cantilever relation to the other.

Figure 5:
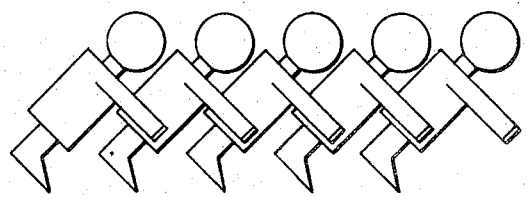
FIG. 5 is a side view of a grouping of the blocks.
Figure 6:
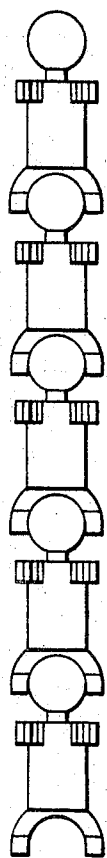
FIG. 6 is a side view of a further grouping of the blocks.
Figure 7:
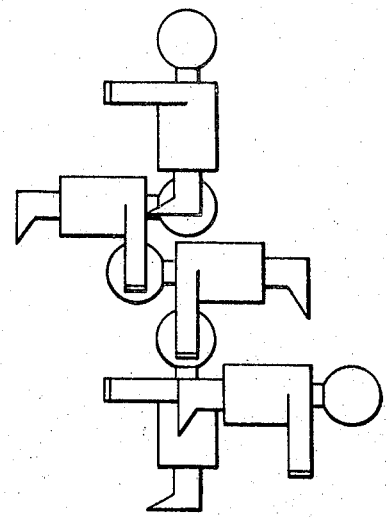
FIG. 7 is a side view of a still further grouping of the blocks.

The inside surfaces of the arms 5 and legs 4 are preferably shaped not only to receive the head 2 or body 3 of another block but also to grip or support such block. As an example the inside of the arms 4 may be inclined inwardly from top to bottom so that the head 2 of another block (disposed upside down) may be held in position. FIGURES 5, 6 and 7 illustrate some of the ways in which a set of blocks can be assembled to form an interengaging group of blocks.

The blocks 1 may be offered for sale in sets of any desired number of blocks, e.g. 5, and the blocks 1 in a set may all represent the same animal figure or may represent different ones. The blocks 1 may be of any convenient size and shape so long as they can be assembled according to the invention and may be made of any suitable material e.g. wood or a suitable plastics material.

Figure 8:
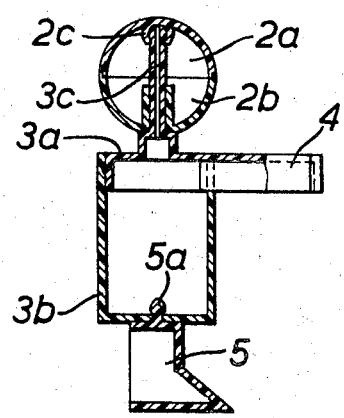
FIG. 8 is a side sectional view of one of the blocks.

The animal blocks may be made in any convenient way for example by moulding as a whole or in parts, and FIGURE 8 shows one method of assembling the block and illustrates a convenient way in which the block may be accurately formed in several different parts. As illustrated in FIG. 8, the head 2 may be formed of two parts, a top part 2a and a lower part 2b which fit together and the body 3 may be in two parts with an upper part 3a moulded with a projecting prong 3c at the top of the neck to pass through the lower part 2b of the head 2 to support it and to fit into a recess 2c on the inside of the top part 2a of the head 2 as a snap fit. In this way, as illustrated, the upper part 3a of the body 3 including the arms may be assembled with the neck and head. The lower part 3b of the body 3 may screw or slide on to the upper part 3a and the legs 5, as one piece, may fit onto the lower part 3b of the body 3 by projections 5a being snapped into recesses. The shaping of the arms 4 and legs 5 to embrace and hold the body 3 or head 2 of an adjacent block is also illustrated in FIGS. 5, 6 and 7.

It will be understood therefore that the underlying idea of the invention is to provide a set of little figures shaped so that certain parts of one figure can engage and fit between the limbs of another figure. The arms are disposed in the horizontal plan and the legs in the vertical plan and the figures are preferably made from a slightly flexible or resilient material to give the necessary flexibility to enable them to be joined together.

I claim:

1. A constructional block shaped like an animal with two pairs of adjacent limbs, a body and a head, said block including connecting means for mutually joining a plurality of said blocks, said connecting means comprising the proportions and shape of said limbs, head and body, said proportions and shape being such that either of the pairs of adjacent limbs of a first block will embrace and fit the head and body of a second block to sustain the first mentioned block in cantilevered relation to said second block.

2. A block according to claim 1 wherein the block is shaped like a human figure with one of said adjacent pair of limbs being positioned with respect to said body so as to represent arms, and the other of said pair of limbs being positioned with respect to said body to represent legs.

3. A constructional block according to claim 1 in which said head has a generally spherical configuration and said body a cylindrical configuration with the radius of said spherical head and the radius of said cylindrical body being substantially equal, both of said pairs of adjacent limbs being outstretched and concave toward the inside, the radius of the concavity of said pairs of adjacent limbs being substantially equal to the said radii of the spherical head and cylindrical body, whereby either of said pairs of adjacent limbs may embrace and fit the head or the body of another block.

References Cited

UNITED STATES PATENTS

| | | |
|---|---|---|
| 1,330,780 | 2/1920 | Bonte. |
| 1,371,619 | 3/1921 | Greenstreet 46—25 |
| 2,691,243 | 10/1954 | Rade 46—25 X |
| 2,752,726 | 7/1956 | Calverly 46—22 |
| 2,786,301 | 3/1957 | Torricelli 46—25 |

FOREIGN PATENTS

| | | |
|---|---|---|
| 625,076 | 6/1949 | Great Britain. |
| 1,112,903 | 11/1955 | France. |

F. BARRY SHAY, Primary Examiner

U.S. Cl. X.R.

46—25